UNITED STATES PATENT OFFICE.

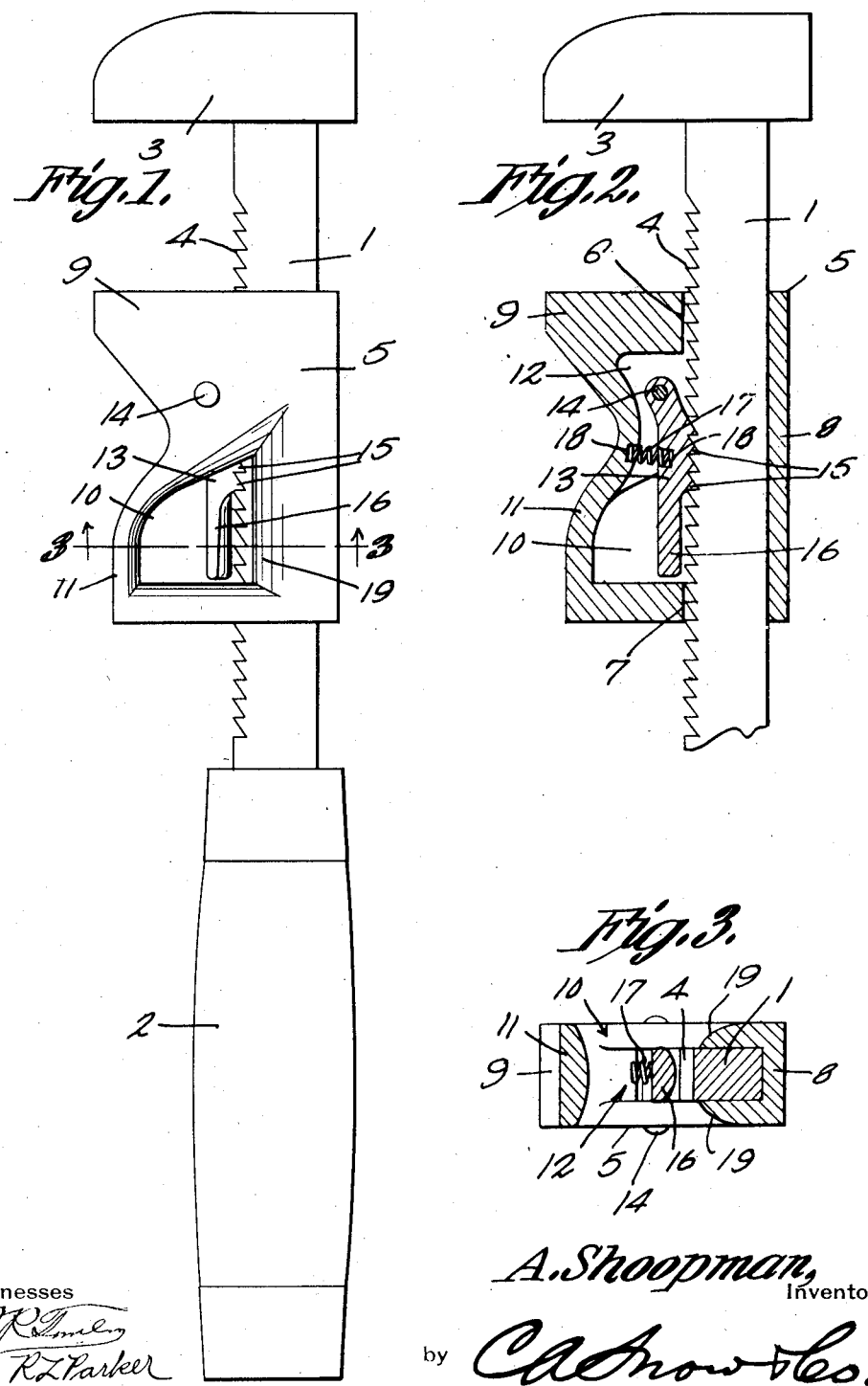

ANDREW SHOOPMAN, OF VERA, TEXAS.

QUICK-ADJUSTABLE WRENCH.

1,344,154.　　　　Specification of Letters Patent.　　Patented June 22, 1920.

Application filed January 23, 1917. Serial No. 143,956.

*To all whom it may concern:*

Be it known that I, ANDREW SHOOPMAN, a citizen of the United States, residing at Vera, in the county of Knox and State of Texas, have invented a new and useful Quick-Adjustable Wrench, of which the following is a specification.

The present invention appertains to wrenches, and aims to provide a quick adjustable wrench of novel and improved construction, which at the same time is extremely simple and inexpensive in construction, as well as being thoroughly practical and efficient in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a side elevation of the improved wrench.

Fig. 2 is a fragmental side elevation with the slide and dog shown in section.

Fig. 3 is a cross section taken on the line 3—3 of Fig. 1.

The wrench embodies a straight shank 1 formed from a bar or other suitable stock, and having fastened upon its inner terminal a suitable handle 2, while a fixed or stationary jaw 3 is attached to the outer end of the shank. The shank is provided along one edge with a series of ratchet teeth 4.

Slidably mounted upon the shank 1 is a slide 5 having the openings 6 and 7 at its outer and inner ends receiving the shank, and having the longitudinal web 8 extending from end to end and bearing slidably against that edge of the shank 1 opposite the teeth 4. The slide 5 is provided at its outer end with an outstanding jaw 9 which is movable with the slide toward and away from the jaw 3.

The slide 5 is provided adjacent to its inner end with an opening 10 extending transversely from one side to the other and exposing the ratchet teeth 4, said opening 10 providing a loop 11 for receiving the thumb and finger of a hand for manipulating the slide 5. The slide 5 also has a recess 12 communicating at one end with the opening 10 and located between the said opening 10 and the outer end or jaw 9 of the slide 5. The recess 12 faces the ratchet teeth 4, and receives one end of a dog or pawl 13, said end of the dog being pivoted upon a transverse pivot pin 14 extending through the slide 5 and its recess 12. The dog 13 is provided between its ends with ratchet teeth 15 engageable with the teeth 4, for preventing the movement of the slide 5 and jaw 9 away from the jaw 3, and the dog is provided at its free end with a finger piece 16 projecting into the opening 10. The dog 13 is pressed toward the ratchet teeth 4 by means of a coiled wire expansion spring 17 confined between the back of the dog and one wall of the recess 12, the dog and said wall of the recess being recessed, as at 18, for receiving the ends of the spring in order to hold it in place. The slide 5 is beveled or chamfered, as at 19, at the opposite sides of the shank 1 at that end of the opening 10 nearest the shank, whereby the thumb and finger can be readily passed along the beveled portions 19 into the opening 10 to grasp the finger piece 16 for moving it away from the shank in a convenient and desirable manner.

In using the wrench, the slide 5 can be readily moved away from the jaw 3 by moving the thumb and finger into the opening 10 from opposite sides along the beveled portions 19, to grasp the finger piece 16, and swing the dog away from the ratchet teeth 4, thus removing the teeth 15 from the ratchet teeth 4, and it is then an easy matter to slide the slide 5 inwardly toward the handle. As soon as the finger piece 16 is released, the spring 17 will move the dog 13 into engagement with the teeth 4, and when the two jaws are brought to opposite sides of the nut, bolt or other object to be turned, the slide 5 can be easily slid toward the jaw 3 for bringing both jaws into engagement with the object, the dog 13 being dragged over the teeth 4 and snapping into engagement therewith, to prevent the inward movement of the slide 5 unless the dog is released manually. It is thus an easy matter to move the jaw 9 toward the jaw 3 to accommodate the particular size of nut, bolt or other object.

Having thus described the invention, what is claimed as new is:

A wrench embodying a shank having ratchet teeth and a fixed jaw, a slide upon the shank and having a jaw movable therewith, there being a recess within the slide and finger receiving openings at the sides of the recess, a dog pivotally mounted within one end portion of the recess and having teeth adjacent its pivot end for engaging the teeth on the shank, and a spring housed within the slide for holding the dog normally in engagement with the shank, said dog having an elongated free end portion constituting a finger piece housed at all times within the recess but exposed through the side openings for engagement by fingers inserted through said openings.

In testimony that I claim the foregoing as my own, I have hereto affixed my signature in the presence of two witnesses.

ANDREW $\overset{\text{his}}{\times}$ SHOOPMAN.
mark

Witnesses:
R. C. SPINKS,
W. F. HOOSER.